(12) United States Patent
Hui et al.

(10) Patent No.: US 8,612,487 B2
(45) Date of Patent: Dec. 17, 2013

(54) TRANSFORMING HIERARCHICAL LANGUAGE DATA INTO RELATIONAL FORM

(75) Inventors: Joshua Wai-ho Hui, San Jose, CA (US); Peter Martin Schwarz, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 13/226,873

(22) Filed: Sep. 7, 2011

(65) Prior Publication Data

US 2013/0060814 A1 Mar. 7, 2013

(51) Int. Cl.
*G06F 17/30* (2006.01)
(52) U.S. Cl.
USPC .................................................. 707/802
(58) Field of Classification Search
USPC .................................................. 707/802
See application file for complete search history.

(56) References Cited

U.S. PATENT DOCUMENTS

2007/0011192 A1* 1/2007 Barton ..................... 707/103 R

OTHER PUBLICATIONS

Beyer, K., et al., "XQuery for Analytics: Challenges and Requirements", First International Workshop on XQuery Implementation, Experience and Perspectives, 2004, 6 pages, Paris, France.
Carmeli, B., et al., "Public Health Affinity Domain: A Standards-Based Surveillance System Solution", BioSurveillance 2007, 2007, 12 pages, 4506, Springer-Verlag Berlin Heidelberg.
Eisenberg, A., et al., "Advancements in SQL/XML", SIGMOD Record, Sep. 2004, 8 pages, vol. 33, No. 33.
Goldman, R., et al., "DataGuides: Enabling Query Formulation and Optimization in Semistructured Databases", Proceedings of the 23rd VLDB Conference, 1997, 10 pages, Athens, Greece.
Haas, L., et al., "Clio Grows Up: From Research Prototype to Industrial Tool", SIGMOD 2005, Jun. 14-16, 2005, pp. 805-810, Baltimore, Maryland, USA.
Disclosed Anonymously, "Method for generating statistical summary of document structure to facilitate data mart model generation", IP.com Prior Art Database Technical Disclosure IPCOM000199141D (located at http://priorartdatabase.com/IPCOM/000199141), Aug. 26, 2010, 4 pages.

* cited by examiner

*Primary Examiner* — Huawen Peng
(74) *Attorney, Agent, or Firm* — Ference & Associates LLC

(57) ABSTRACT

Described herein are methods, systems, apparatuses and products for transforming hierarchical language data into relational form. An aspect provides for assembling at least one statistical summary of at least one hierarchical language data source responsive to execution of program instructions accessible to at least one processor operatively connected to a memory device; accessing at least one entity of interest selected from the at least one statistical summary; generating at least one target hierarchical language model based on the at least one entity of interest; and transforming data from the at least one hierarchical language data source into at least one relational form by executing transformation artifacts generated based on a type of the relational form. Other aspects are disclosed herein.

7 Claims, 11 Drawing Sheets

FIG. 4

Function assignSQLMapping(TargetModelNode N, String TableNameA):

I.  If TableNameA is null or N has maximum occurrence of *unbounded*, assign a new table name TableNameN for node N II.  If not, TableNameN= TableNameA III.  For each attribute, Ai, of N:

A. Assign a column name Ci for Ai belong to table TableNameN

B. If N has any content, assign a column name CN for N, which belongs to table TableNameN IV.  For each descendant node, Ci of N:

A. Call assignSQLMapping(Ci,, TableNameN)

FIG. 5

```
Function generateSQLDefinition(TargetModelNode N, String AncestorTableName ):

Set TableNameC = AncestorTableName

If N has SQL table name, TableNameN specified:
        Set TableNameC = TableNameN
        Add an object of TableNameN to SQLTableSet if not exist. Call it SQLTableObjectC Otherwise, look up the existing table object, SQLTableObjectC, for TableNameC If N has a SQL column name, ColumnNameN, specified, with SQL type, TypeN:
        Add a column object of ColumnNameN with sql type, TypeN to SQLTableObjectC For all the attributes AttrN of N:
        If AttrN has a SQL column name, ColumnNameAttrN, specified, with SQL type, TypeAttrN
            Add a column object of ColumnNameAttrN with sql type, TypeAttrN to
            SQLTableObjectC
For each descendant node, Ci,, of N:
        call generateSQLDefinition(Ci, TableNameC)
```

FIG. 7

|  | Table | Column | SQL Data Type |
|---|---|---|---|
| ⊞ ⬥ Report | REPORT | --- | --- |
|   ⊞ ⬥ patient | | | |
|   ⊞ ⬥ vital signs | | | |
|     ⊞ ⬥ component | | | |
|       ⊞ ⬥ Body Weight | VITAL_SIGNS | | |
|         ⊞ ⬥ code | | | |
|           ⬥ displayName | --- | TEST_NAME | VARCHAR(256) |
|           ⬥ codeSystem | --- | | |
|           ⬥ code | --- | TEST_CODE | VARCHAR(256) |
|           ⬥ codeSystemName | --- | | |
|         ⊞ ⬥ effectiveTime | | | |
|           ⬥ value | --- | OBSERVATION_TIME | TIMESTAMP |
|         ⊞ ⬥ value | | | |
|           ⬥ value | --- | TEST_VALUE | DECIMAL(8,2) |
|           ⬥ unit | --- | TEST_UNIT | VARCHAR(256) |
|       ⊞ ⬥ Body Height | VITAL_SIGNS | | |
|         ⊞ ⬥ code | | | |
|           ⬥ displayName | --- | TEST_NAME | VARCHAR(256) |
|           ⬥ codeSystem | --- | | |
|           ⬥ code | --- | TEST_CODE | VARCHAR(256) |
|           ⬥ codeSystemName | --- | | |
|         ⊞ ⬥ effectiveTime | | | |
|           ⬥ value | --- | OBSERVATION_TIME | TIMESTAMP |
|         ⊞ ⬥ value | | | |
|           ⬥ value | --- | TEST_VALUE | DECIMAL(8,2) |
|           ⬥ unit | --- | TEST_UNIT | VARCHAR(256) |

TRANSFORMING HIERARCHICAL LANGUAGE DATA INTO RELATIONAL FORM

BACKGROUND

Hierarchical languages are popular data representation languages used by many applications and industrial standards for purposes such as web development, documentation, and database development. Widely used hierarchical languages include Extensible Markup Language (XML), JavaScript Object Notation (JSON), and YAML Ain't Markup Language (YAML). Advantages of hierarchical languages include portability, expansion capabilities, platform and vendor independence, and relative ease of use. Although hierarchical language database technology has been around for some time, the vast majority of the marketplace relies on relational technology for querying, aggregation, report generation, and extract, transform, and load (ETL) operations.

BRIEF SUMMARY

In summary, one aspect provides a system comprising: at least one processor; and a memory device operatively connected to the at least one processor; wherein, responsive to execution of program instructions accessible to the at least one processor, the at least one processor is configured to: assemble at least one statistical summary of at least one hierarchical language data source; access at least one entity of interest selected from the at least one statistical summary; generate at least one target hierarchical language model based on the at least one entity of interest; and transform data from the at least one hierarchical language data source into at least one relational form by executing transformation artifacts generated based on a type of the at least one relational form.

Another aspect provides a method comprising: assembling at least one statistical summary of at least one hierarchical language data source responsive to execution of program instructions accessible to at least one processor operatively connected to a memory device; accessing at least one entity of interest selected from the at least one statistical summary; generating at least one target hierarchical language model based on the at least one entity of interest; and transforming data from the at least one hierarchical language data source into at least one relational form by executing transformation artifacts generated based on a type of the at least one relational form.

A further aspect provides a computer program product comprising: a computer readable storage medium having computer readable program code configured, the computer readable program code comprising: computer readable program code configured to assemble at least one statistical summary of at least one hierarchical language data source; computer readable program code configured to access at least one entity of interest selected from the at least one statistical summary; computer readable program code configured to generate at least one target hierarchical language model based on the at least one entity of interest; and computer readable program code configured to transform data from the at least one hierarchical language data source into at least one relational form by executing transformation artifacts generated based on a type of the at least one relational form.

The foregoing is a summary and thus may contain simplifications, generalizations, and omissions of detail; consequently, those skilled in the art will appreciate that the summary is illustrative only and is not intended to be in any way limiting. For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 4 provides an exemplary target XML model configured according to an embodiment.

FIG. 5 provides an example process for automatically generating a default mapping for a target model according to an embodiment.

FIG. 7 provides an example process for generating DDL files according to an embodiment.

FIG. 8 provides an example target XML model according to an embodiment.

DETAILED DESCRIPTION

Figure 1:
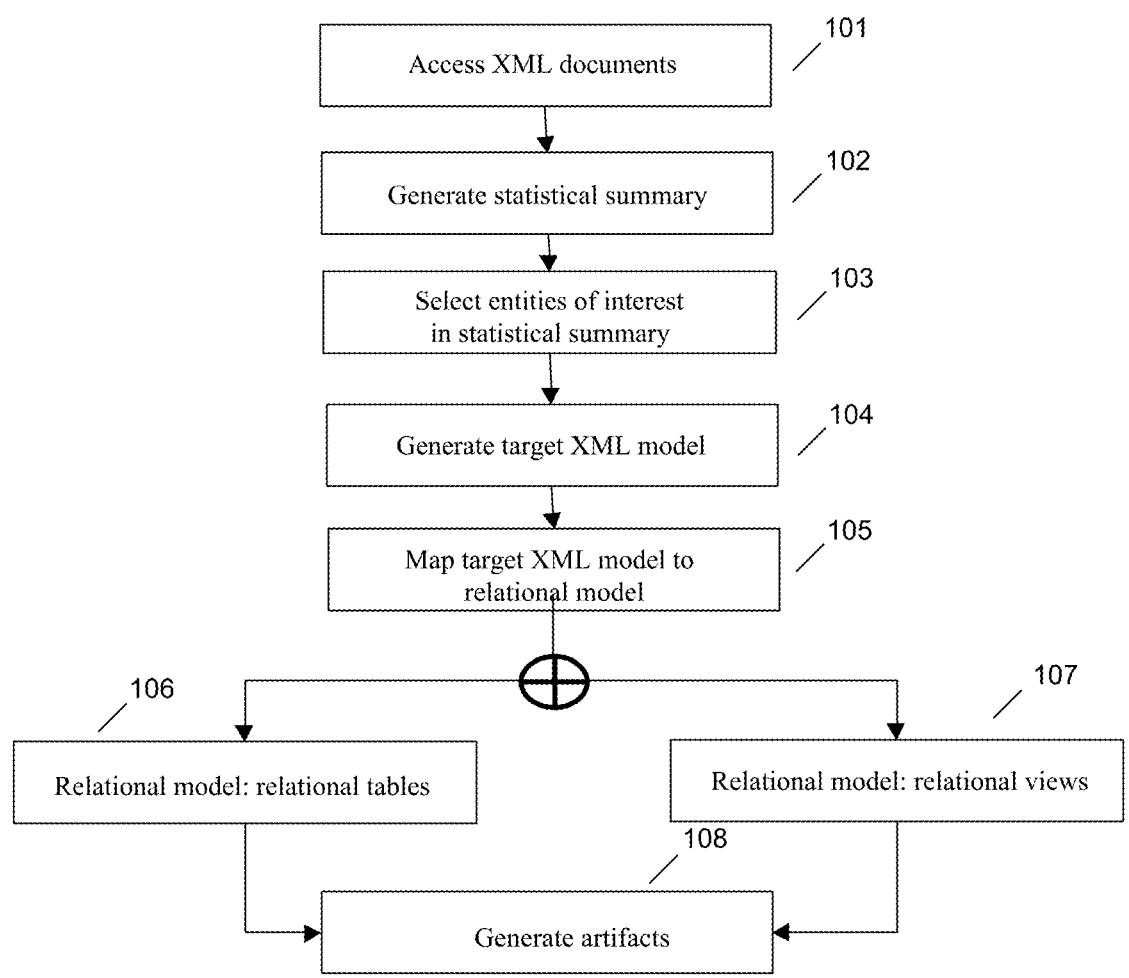
FIG. 1 provides an example process for transforming XML documents into relational form according to an embodiment.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of certain example embodiments.

Reference throughout this specification to an "embodiment" or "embodiment(s)" means that a particular feature, structure, or characteristic described in connection with the embodiment is included in at least one embodiment. Thus, the appearances of "embodiment" or "embodiment(s)" in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that aspects can be practiced without one or more of the specific details, or with other methods, components, materials, et cetera. In other instances, well-known structures, materials, or operations are not shown or described in detail to avoid prolixity.

Hierarchical languages are widely used data representation languages. Primary examples include Extensible Markup Language (XML), JavaScript Object Notation (JSON), and YAML Ain't Markup Language (YAML). XML is used by many applications and industrial standards, including the Clinical Document Architecture (CDA) developed by the international healthcare standards organization Health Level 7 (HL7), the Research Information Markup Language (RIXML), and the eXtensible Business Reporting Language (XBRL). However, most business information (BI) tools do not support data represented as XML. Instead, today's BI tools such as IBM Cognos®, Business Intelligence and Reporting Tools (BIRT), SAS®, and SPSS® are primarily designed to work with data in a tabular format, such as in relational databases or spreadsheets. Cognos® and SPSS® are registered trademarks of International Business Machines Corporation in the United States, other countries, or both. SAS® is a registered trademark of SAS Institute Inc. in the United States and other countries. Therefore, data represented in XML must be converted into relational form before these tools can be applied, and an ineffective choice for the relational representation can result in poor performance on analytical queries.

According to current technology, the following represent the available practical methods for using BI tools on data represented in XML: (1) virtualize the XML data as relational tables (e.g., by using the SQL/XML language to create relational views of the data); or (2) transform the XML documents into relational form and store them in the relational format. However, these solutions require the creation of a mapping between the original XML representation and a relational representation that can be consumed by the BI tools.

There are tools available that facilitate the creation of mappings that convert XML data to relational form. Examples include International Business Machine Corporation's Clio, Altova® MapForce®, and Stylus Studio®. Altova® and MapForce® are registered trademarks of Altova GmbH in the United States and other countries. Stylus Studio® is a registered trademark of Progress Software Corporation, in the United States and other countries. However, these mapping tools rely solely on the XML schema of the source XML documents as a means of describing the format, source, target, and implementation of the mapping. The same is true of typical Extract/Transform/Load (ETL) tools, such as International Business Machine Corporation's InfoShpere® DataStage® and Oracle® Warehouse Builder. InfoSphere® and DataStage® are registered trademarks of International Business Machines Corporation in the United States, other countries, or both. Oracle® is a registered trademark of Oracle and/or its affiliates.

The XML schemas defined by industrial standards such as those listed above are often very complex and permit many structural variations that may never be seen in a given context. Overall, the schemas do not provide enough information to guide the user in the design of a mapping. Therefore, the task of defining appropriate mappings between XML and relational representations of data according to existing technology remains cumbersome and error-prone, and continues to be a barrier to the use of BI tools on XML data.

Embodiments provide processes for mapping hierarchical language data to relational data. In an exemplary embodiment, a target hierarchical language model is generated from source hierarchical language data, the target hierarchical language model is mapped to form a relational data structure, and transformation artifacts are generated which may be utilized to, inter alia, generate relational database tables or views for the associated source hierarchical language data. According to embodiments, the target hierarchical language model may be generated by selecting entities of interest from a hierarchical language document summary. Embodiments may be configured to generate artifacts that operate to facilitate actual runtime transformations from original hierarchical language documents into one or more relational models. Artifacts may be generated according to embodiments so as to create SQL/hierarchical language views or to materialize the data in relational tables. Although examples and embodiments described herein utilize XML, embodiments are not so limited, as embodiments may be configured to operate with any hierarchical language capable of achieving similar results, including, but not limited to, JSON and YAML.

An example process for transforming XML documents into relational form according to an embodiment is provided in FIG. 1. A collection of XML documents is accessed 101 and a statistical, or semantic, summary is generated 102 for the documents. Embodiments provide that the statistical summary may be in the form of a Semantic Data Guide (SDG), described further below. Entities of interest in the statistical summary are selected 103 and a customized target XML model is created 104 based on the selected entities. The target XML model is mapped to a relational model 105 to create the artifacts 108. The original XML data may be transformed into relational data either by being materialized as a set of relational tables 106 or virtualized as a set of relational views 107, leading to the generation of the artifacts 108.

A Semantic Data Guide (SDG) data structure may be used to obtain XML data characteristics, including, but not limited to structure and unique data variations. In general, an SDG is a statistical summary of a collection of XML documents. Processes for generating and utilizing SDG data structures have been disclosed in "Method for Generating Statistical Summary of Document Structure to facilitate Data Mart Model Generation," disclosed anonymously, IP.com number PCOM000199141D (hereinafter, the "'141D publication"), published Aug. 26, 2010, the contents of which are incorporated by reference as if fully set forth herein.

The SDG includes statistical information specific to the collection, including the prevalence of constructs in the collection, both as a whole and in particular contexts. The SDG is simpler than the XML schema associated with the documents, because it only includes alternatives that actually occur, rather than all that are hypothetically possible. As such, a primary advantage of forming an SDG involves delineating those structural variants that actually exist in an XML collection, which is typically a much smaller set that those theoretically allowed by an associated XML schema.

An SDG may be constructed by parsing the documents in the repository to be analyzed (or a representative sample) while building a summary of the variations encountered and collecting various statistics. New document types may be accommodated by an SDG through incremental updates. The SDG is structured as a tree, in which each node represents the actual occurrence, in one or more documents, of a particular element in a particular context. An SDG may be configured to only show what is actually present in a collection of documents and to include various statistics relevant for understanding the source documents. Embodiments further provide for SDG data structures comprising information about content as well as structure, for example, statistical information about the distribution of values in a particular field.

In concert with the use of an SDG, discriminators may be used to better describe the XML documents in a collection. In general, a discriminator is comprised of a rule describing how the structure and/or content of one or more documents may be constrained depending on other values in the documents. A discriminator may also supply semantic information about the nature or intent of a document portion that is more specific than the information supplied by the name of the corresponding element or type in the XML schema. For example, discriminators generated based on elements with the same generic name may be separated based on the values of the elements that provide additional information about what the element is intended to represent. In the SDG, a document element containing a discriminator may be split into multiple elements, each of which is bound to a particular discriminator value and represents a different semantic purpose and its correspondingly constrained document structure.

Customized XML models may be generated which are based on a semantic data structure of a source model for a subject XML document, such that the XML document may be transformed to conform to the customized XML model. Exemplary processes for generating XML models have been described in co-pending and commonly assigned U.S. patent application Ser. No. 13/197,584, entitled "SYSTEM FOR SIMPLIFYING THE PROCESS OF CREATING XML DOCUMENT TRANSFORMATIONS," filed on Aug. 3, 2011 (hereinafter, the "'584 application"), the contents of which are incorporated by reference as if fully set forth herein. In certain embodiments, the semantic data structure may be an SDG data structure.

Relational data structures, such as data tables, may be automatically generated through an initial mapping of a target XML model. According to embodiments, the mapping may be based on statistics, such as statistics collected in the SDG. Illustrative and non-restrictive examples of statistics include the following: total occurrences: the percentage of documents in the XML collection that contain the path corresponding to one or more particular nodes; contextual occurrences: percentage of documents in the collection that contain the immediate prefix of the path corresponding to a particular node that also contain the path corresponding to the node itself; maximum and minimum arity: the maximum/minimum number of immediate descendant nodes possessed by nodes in the collection that match a particular path; and maximum and minimum cardinality: the maximum/minimum number of occurrences of a descendent node in documents in the collection that match the immediate prefix of a particular path. A user may subsequently fine-tune the mapping by changing the names of relational data structure elements, such as tables or columns, or by adjusting data types.

Figure 2:
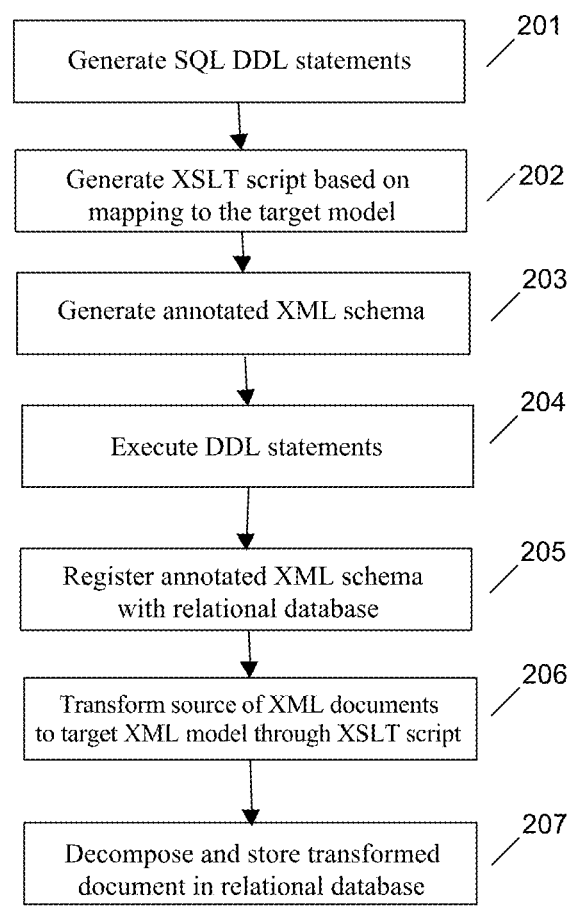
FIG. 2 provides an example process for generating transformation artifacts and the execution of the artifacts to transform source XML data to relational data according to an embodiment.

Transformation artifacts may be generated according to embodiments based on the initial mapping of the XML model. Processes for creating artifacts may depend on one or more purposes for generating the relational data structures. In one embodiment, the purpose is to materialize the subject XML data as a set of relational tables. Referring to FIG. 2, therein is depicted an example process for generating transformation artifacts and the execution of the artifacts to transform source XML data to relational data according to an embodiment. In the example provided in FIG. 2, the subject XML data is materialized as a set of relational tables. SQL Data Definition Language (DDL) statements may be generated 201 to create relational tables with the proper schema and data types. An XSLT script may be generated based on the mapping to the target model 202. An annotated XML schema file is generated 203 that contains annotations describing how to shred XML documents that conform to the target XML model into relational tables, for example, as specified by a system user. The transformation is prepared by executing the DDL statements 204 to create the relational tables and register the annotated XML schema with the relational database 205 in which the transformed data is stored. For each document to be transformed, the source of XML documents may be transformed to the target XML model through a XSLT script 206, and the transformed document is decomposed and stored in a resultant relational database 207, such that values are sent to the proper tables and columns, as specified in the annotated XML schema.

Figure 3:
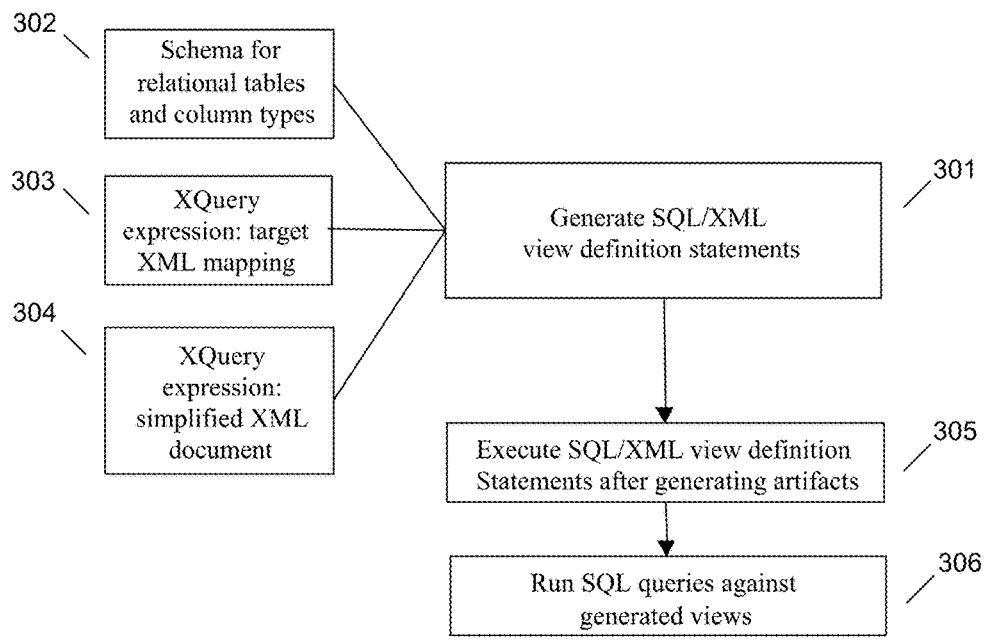
FIG. 3 provides another example process for generating transformation artifacts and the execution of the artifacts to transform source XML data to relational data according to an embodiment.

In FIG. 3, therein is depicted an example process for generating transformation artifacts and the execution of the artifacts to transform source XML data to relational data. The example of FIG. 3 depicts an embodiment wherein the XML source data is virtualized as a set of relational views. SQL/XML view definition statements are generated 301, wherein each statement contains the following: the schema for a relational table and its column types, as specified by the mapping 302; an Xquery expression describing the mapping between each column of the table and a fragment of the simplified XML document represented by the target XML model 303; and an XQuery expression describing the generation of a simplified XML document conforming to the target XML model from an original XML document 304. Once the artifacts are generated, the SQL/XML view definition statements may be executed 305 to create the views in the relational database. SQL queries may be run against the view 306 and the relational database engine will handle the query processing needed to extract and transform the data.

Processes configured according to embodiments produce a relational representation of XML data and are advantageous over existing technology in at least the following aspects: more information about the semantic and structural variation in source XML data is provided, beyond what is described in the XML schema of the source documents; just the information of interest is extracted, for example, through an interface that does not require a target schema to be predefined. Embodiments may be configured to map XML data into relational form against the simplified XML target model, rather than the complex original XML schema. As such, users only need to be concerned with mapping a smaller and more-focused set of elements.

Statistical information about the source documents may be recorded in an SDG to optimize the initial relational mapping, by minimizing the number of tables generated. A non-limiting example provides that the schema for an XML collection containing health information for patients at a particular facility may allow a patient to have multiple names, but the statistics may show that all the documents in a given collection have exactly one name per patient. Therefore, the relational model can represent the patient name with a column in the patient table, rather than requiring a separate table to contain patient names. In addition, embodiments may analyze the data in a field and identify the right data type and length for the corresponding column.

Figure 4:
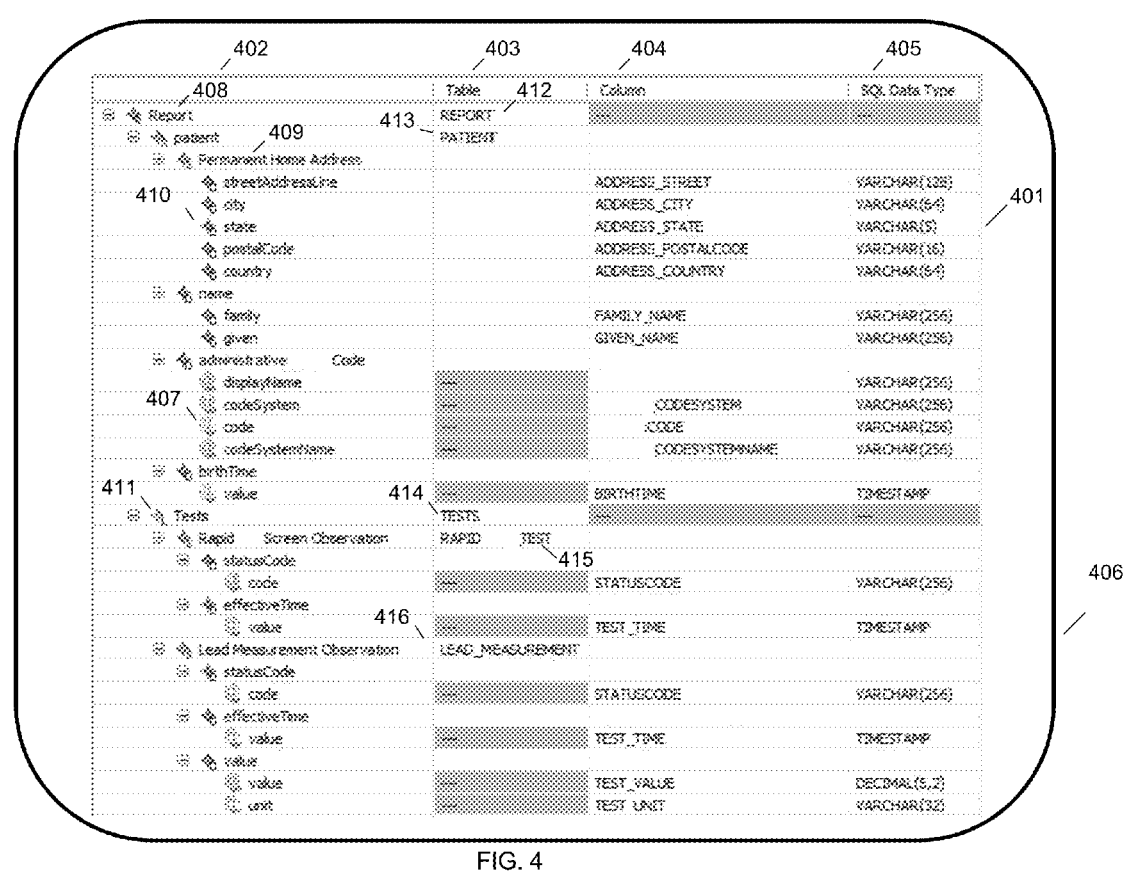

An exemplary target XML model configured according to an embodiment is illustrated in FIG. 4. As described in the '584 application and the '141D publication, the target XML model 401 may be created, for example, by the selection of document subtrees from the SDG followed by refinement (e.g., renaming or pruning of individual items). The example target XML model 401 may be comprised of multiple columns 402-405, including hierarchical structure 402, table 403, column 404, and SQL data type 405 columns. In FIG. 4, the target XML model 401 is presented through an editor 406 that may use certain icons to represent certain elements, such as attributes and particular node types. The attribute icon 407 denotes attributes, while nodes may be represented as root nodes 408, source nodes 409, source descendent nodes 410, and root nodes (like local nodes) 411.

The editor 406 may be extended according to embodiments to provide the capability of mapping any element node 408-411 or attribute node 407 in the target XML model 401 to a relational table 403 or column 404. In the example illustrated in FIG. 4, the five tables REPORT 412, PATIENT 413, TESTS 414, RAPID_TEST 415, and LEAD_MEASUREMENT 416 have been created from the target XML model 401. Table REPORT 412 is the master table, containing one row for each transformed document, which is referenced by rows in two subordinate tables PATIENT 413 and TESTS 414. Rows in the TESTS 414 table are similarly referenced by rows in the RAPID_TEST 415 and LEAD_MEASUREMENT 416 tables. Target XML model 401 elements including, but not limited to, table names 412-415, column names 404, and SQL data types 405 for target model elements or attribute nodes may be specified using the editor 406, for example, by entering them directly in the corresponding cell.

FIG. 5 provides an example process for automatically generating a default mapping for a target model according to an embodiment, wherein each attribute or element with content is mapped to a relational column. According to embodiments, any model element that can occur only once may be represented by a column in the table corresponding to its immediate ancestor element, whereas elements that can repeat must be represented by a separate table (whose columns would, in turn, contain the content and non-repeating subparts of the repeating element) and which references the table containing its immediate ancestor element via a foreign key. A naïve process configured according to an embodiment may use the XML schema of the source documents to determine which elements can repeat, and map them to tables or columns as described above. To avoid generating unnecessary tables, embodiments may leverage statistics collected during construction of the SDG and recorded therein. An illustrative and non-restrictive example provides that if the maximum occurrence of an element is one, a separate table does not need to be created for the element, and its value may be stored as an additional column in the table associated with its closest mapped immediate ancestor.

Subsequent to target XML model generation and mapping, artifacts may be generated for transforming original XML data into relational form. According to embodiments, at least the following three artifacts may be generated: a Data Definition Language (DDL) file for defining the relational tables and their columns; an XSLT file describing the transformation of source documents to the simplified target model; and an annotated XSD schema, consisting of an XML schema annotated with instructions for mapping conforming documents to relational tables and columns. Once the DDL, XSLT, and XSD artifacts have been generated, the example process illustrated in FIG. 6 and configured according to embodiments may be used to transform XML documents as captured in an SDG to the designated relational table and columns as specified in the target XML model.

Figure 6:
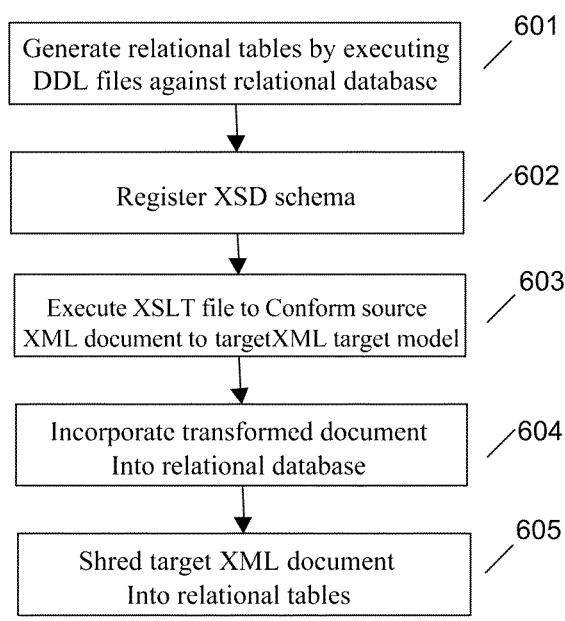
FIG. 6 provides another example process for transforming XML documents to relational data according to an embodiment.

As provided in FIG. 6, an initial step involves creating relational tables by executing the DDL file against a relational database 601, such as DB2®. DB2®, is a registered trademark of International Business Machines Corporation in the United States, other countries, or both. The XSD schema file may be registered to a relational database that supports an annotation-driven decomposition engine 602. A non-limiting example of such relational databases includes DB2®, V9.7. For each source document conforming to the original XML schema, a compliant XSLT processor is used to execute the XSLT file 603, thereby transforming the source XML document to one that conforms to the target XML model. Examples of compliant XSLT processors include, but are not limited to Apache Xalan® or Saxon. Xalan® is a registered trademark of Apache Software Foundation. The transformed document may be incorporated into the relational database 604. The annotation-driven decomposition engine will shred the target XML document into relational tables in accordance with the annotations specified in the XSD schema file 605.

Referring to FIG. 7, therein is provided an example process for generating DDL files according to an embodiment. The example process shown in FIG. 7 operates utilizing a set, for example, SQLTableSet, which maintains a list of SQL table objects. Each SQL table object contains a set of column objects that describe properties of the column, including, but not limited to its name, SQL type, nullability, and whether it forms a part of the table's primary key. In the example embodiment provided in FIG. 7, the initial call to the generateSQLDefinition( ) function may have the root target model node as N and the AncestorTableName with a value of null. After calling the generateSQLDefinition( ) function, the example shown in FIG. 7 may iterate through the SQLTableSet and, for each table object, the corresponding SQL CREATE TABLE statement may be generated with the corresponding column definition.

The XSLT transformation script may be generated according to embodiments by utilizing an MSL mapper, configured according to the mapping specification generated for the target XML model created by the method described in the '584 application. Exemplary mapping specifications include the following: a mapping that represents the transfer of an atomic data element from source to target; a mapping that represents the transfer of a compound data element from source to target; a mapping that represents the transfer from source to target of selected instances of a repeating element; a mapping that selectively combines data from multiple source elements to produce target elements; and a mapping generated from the source schema to the target schema.

In one embodiment, a process for generating XSD schema may be given by the following genXSDComponent( ) function, which takes a target XML model node N as an argument:

(1) Create global set Pool$_{XSD}$ and global target schema XSD$_T$. Both are initially empty.
(2) Create an empty foreign key element map for relating the rowsets of the immediate ancestor table and descendant's associated rowsets, FKAncestorTableMap.
(3) Set the locationPath to be "/"+name of the root target node.
(4) Call function genXSDComponent(R), where R is the root of the target model.
(5) Add the returned element declaration ElemDecl$_R$ to XSD$_T$.

Function genXSDComponent(TargetModelNode N, String locationPath, String ancestorTableRowSet, Map FKAncestorTableMap):

I. From the SDG, determine CP$_N$, the context path for node N.
II. Create empty sets AttrDeclSet$_N$ and ElemDeclSet$_N$.
III. Check whether the current node N, has any table name assigned:
A. If so,
1. Assign a new rowset tableRowSet$_N$ with name based on the assigned table name and the path of node N. Add the annotation for this rowset to the schema file;
2. Set newTableRowSetCreated=true;
3. Add the rowset tableRowSet$_N$ to the FKAncestorTableMap for the ancestorTableRowSet (as the key).
B. If not,
1. Set tableRowSet$_N$=ancestorTableRowSet;
2. Set newTableRowSetCreated=false.

C. For each attribute A of node N:
 1. Look up the original data type $T_A$ in the SDG using the context path information, $CP_N$, and the source XML Schema;
 2. Look up the minimum cardinality of the attribute in the SDG (it may be either 0 or 1);
 3. Create an attribute declaration $AttrDecl_A$ and assign the original type, $T_A$, to the attribute declaration. If the attribute's minimum cardinality is 0, make the attribute optional.
 4. Add $AttrDecl_A$ to the attribute declaration set, $AttrDeclSet_N$.

D. For each immediate descendant node C of N:
 1. Get the XML name of C, and append it to the locationPath. It becomes $locationPath_C$;
 2. Recursively call genXSDComponent(C, $locationPath_C$, tableRowSet), which will generate the corresponding immediate descendant element declaration, $ElemDeci_C$;
 3. Add $ElemDeci_C$ to $ElemDeclSet_N$.

E. Given the attribute declaration set, $AttrDeclSet_N$ and the element declaration set, $ElemDeclSet_N$, find whether there is any schema type in $Pool_{XSD}$ with sets that contain the same members:
 1. If so, let $T_N$ be the matching type from $Pool_{XSD}$.
 2. If not, let $T_N$ be a new type definition with attributes and elements as specified by sets $AttrDecl_A$ and $ElemDeci_C$, and add it to $XSD_T$ and $Pool_{XSD}$.

F. For each attribute declaration, $AttrDecl_A$, in $AttrDeclSet_N$ in $T_N$:
 1. If there is any column name, $CName_A$, with a SQL type X, assigned for attribute A, add the following annotation to the attribute declaration:

$AttrDecl_A$ for the rowset $tableRowSet_N$
```
<db2-xdb:rowSetMapping db2-xdb:locationPath= "<locationPath>">
    <db2-xdb:rowSet><tableRowSet_N></db2-xdb:rowSet>
    <db2-xdb:column><CNameA></db2-xdb:column>
    <db2-xdb:expression>CAST($DECOMP_CONTENT AS <X>)</db2-xdb:expression>
</db2-xdb:rowSetMapping>
```

Note that if there is any conversion needed, instead of the simple SQL CAST function, we can define a SQL UDF function, F, and then invoke the function like the following:

```
<db2-xdb:rowSetMapping db2-xdb:locationPath= "<locationPath>">
    <db2-xdb:rowSet><tableRowSet_N></db2-xdb:rowSet>
    <db2-xdb:column><CNameA></db2-xdb:column>
    <db2-xdb:expression>F($DECOMP_CONTENT)
    </db2-xdb:expression>
</db2-xdb:rowSetMapping>
```

G. If newTableRowSetCreated is true:
 1. Add the following schema annotations to $T_N$ to capture the document id and element id value for the node N with the locationPath:

For document id, assume the value is stored in a varchar column named DOCID with length 256 for the table associated with the rowset $tableRowSet_N$.

```
<db2-xdb:rowSetMapping db2-xdb:locationPath= "<locationPath>">
    <db2-xdb:rowSet><tableRowSet_N></db2-xdb:rowSet>
    <db2-xdb:column>DOCID</db2-xdb:column>
    <db2-xdb:expression>CAST($DECOMP_DOCUMENTID AS VARCHAR(256))</db2-xdb:expression>
</db2-xdb:rowSetMapping>
```

For element id, assume the value is stored in a column named ID with 256 in length for the table associated with the rowset $tableRowSet_N$:

```
<db2-xdb:rowSetMapping db2-xdb:locationPath= "<locationPath>">
    <db2-xdb:rowSet><tableRowSet_N></db2-xdb:rowSet>
    <db2-xdb:column>ID</db2-xdb:column>
    <db2-xdb:expression>CAST($DECOMP_ELEMENTID AS VARCHAR(256))</db2-xdb:expression>
</db2-xdb:rowSetMapping>
```

IV. For each immediate descendant rowset, $descendantRowSet_N$ from FKAncestorTableMap which is associated with $tableRowSet_N$:
 Create a schema annotation to store the element id of node N in the column ANCESTOR_ID of the table associated with $descendantRowSet_N$. This element id will be the ancestor key for the rows in the table for the rowset $descendantRowSet_N$ (assume the ancestor id column is also with 256 in length):

```
<db2-xdb:rowSetMapping db2-xdb:locationPath= "<locationPath>">
    <db2-xdb:rowSet><descendantRowSet_N></db2-xdb:rowSet>
    <db2-xdb:column>ANCESTOR_ID</db2-xdb:column>
    <db2-xdb:expression>CAST($DECOMP_ELEMENTID AS VARCHAR(256))</db2-xdb:expression>
</db2-xdb:rowSetMapping>
```

Remove the $descendantRowSet_N$ from FKAncestorTableMap for $tableRowSet_N$.

V. Look up the minimum and maximum cardinality of the element in the SDG.

VI. Create an element declaration $ElemDecl_N$, and set its name to the name of node N.

VII. If the minimum cardinality from the SDG is 0, set the minimum cardinality of the new element to 0, otherwise set it to 1. If the maximum cardinality from the SDG is >1, set the maximum cardinality of the element to "unbounded;" otherwise set it to 1.

VIII. Assign type $T_N$ to $ElemDecl_N$.

IX. Return $ElemDecl_N$.

Transformation to a relational model may be implemented by generating one or more sets of SQL/XML views according to embodiments, with content dynamically derived from the original XML documents. When a database query is executed against an SQL/XML view, the database query engine may extract pieces of XML data from the original XML documents and convert them to relational format. Embodiments provide that for each assigned table in the target XML model, there may be one or more CREATE VIEW statements. Each view definition may be configured according to embodiments to consist one or more parts. A first part may be comprised of an XQuery expression that transforms the original XML document into a simplified XML document that conforms to the target XML model. The XQuery expression may be optimized such that the only the portions of the original document that are transformed are those containing the data elements needed to populate the columns of the desired view. Another part may consist of an XMLTable function invocation that wraps around the XQuery expression to extract individual data elements and map them to columns in the desired view.

The following provides an exemplary SQL/XML statement according to an embodiment for creating a view that maps "patient" elements from source documents to the PATIENT 413 table referred to in the target XML model 401 of FIG. 4:

'Statement (1)

```
CREATE VIEW WAREHOUSE.PATIENT (
    DOCID,
    ID,
    ANCESTOR_ID,
    ADDRESS_STREET,
```

-continued

```
    ADDRESS_CITY,
    ADDRESS_STATE,
    ADDRESS_POSTALCODE,
    ADDRESS_COUNTRY,
    FAMILY_NAME,
    GIVEN_NAME,
    CODESYSTEM,
    CODE,
    CODESYSTEMNAME,
    BIRTHTIME
) AS
```

'Statement (2):

```
WITH T AS (
    SELECT S.FILENAME, XQ.DOC FROM XMLDOCTABLE S,
    XMLTABLE(
    XMLNAMESPACES('urn:hl7-org:v3' AS "tns"),
```

'Statement (3)

```
'(: Prolog :)
(: Static namespace declarations :)
declare namespace xsl="http://www.w3.org/1999/XSL/Transform";
declare namespace xalan="http://xml.apache.org/xslt";
declare namespace str="http://exslt.org/strings";
declare namespace set="http://exslt.org/sets";
declare namespace math="http://exslt.org/math";
declare namespace fn="http://www.w3.org/2005/xpath-functions";
declare namespace exsl="http://exslt.org/common";
declare namespace date="http://exslt.org/dates-and-times";
declare namespace io="urn:hl7-org:v3";
declare namespace xsi="http://www.w3.org/2001/XMLSchema-instance";
declare namespace xs="http://www.w3.org/2001/XMLSchema";
declare namespace msl="http://www.ibm.com/xmlmap";
declare namespace jdbc="jdbc://com.ibm.ct.db";
(: Declare external Java method calls :)
    document {
        element io:Report {
            let $recordTarget_0_in0 := $sd/io:ClinicalDocument/io:recordTarget
            return
                for $recordTarget_0_in0 at $recordTarget_0_in0-index in (:<<<FOR:)
$recordTarget_0_in0[(../io:templateId/@root = "1.3.6.1.4.1.19376.1.3.3") and
(../io:code/@codeSystem = "2.16.840.1.113883.6.1") and (../io:code/@code =
"18719-5") and (io:patientRole/io:patient)] (:>>>:)
                return
                    element io:patient {
                        attribute eid_ {
                            data( (:<<<XPATH:) $recordTarget_0_in0-index (:>>>:) )
                        },
                        let $addr_2_in0 := $recordTarget_0_in0/io:patientRole/io:addr
                        return
                            for $addr_2_in0 at $addr_2_in0-index in (:<<<FOR:)
$addr_2_in0[(@use = "HP")] (:>>>:)
                            return
                                element io:PermanentHomeAddress {
                                    attribute eid_ {
                                        data( (:<<<XPATH:) $addr_2_in0-index (:>>>:) )
                                    },
                                    for $text___ in $addr_2_in0/text( )
                                    return
                                        data( $text___ ),
                                    for $streetAddressLine_4_in0 at $streetAddressLine_4_in0-
index in $addr_2_in0/io:streetAddressLine
                                    return
                                        element io:streetAddressLine {
                                            attribute eid_ {
                                                data( (:<<<XPATH:) $streetAddressLine_4_in0-index
(:>>>:) )
                                            },
```

```
                                    for $text___ in $streetAddressLine_4_in0/text( )
                                    return
                                        data( $text___ )
                                },
                                for $city_9_in0 at $city_9_in0-index in $addr_2_in0/io:city
                                return
                                    element io:city {
                                        attribute eid_ {
                                            data( (:<<<XPATH:) $city_9_in0-index (:>>>:) )
                                        },
                                        for $text___ in $city_9_in0/text( )
                                        return
                                            data( $text___ )
                                },
                                for $state_14_in0 at $state_14_in0-index in
$addr_2_in0/io:state
                                return
                                    element io:state {
                                        attribute eid_ {
                                            data( (:<<<XPATH:) $state_14_in0-index (:>>>:) )
                                        },
                                        for $text___ in $state_14_in0/text( )
                                        return
                                            data( $text___ )
                                },
                                for $postalCode_19_in0 at $postalCode_19_in0-index in
$addr_2_in0/io:postalCode
                                return
                                    element io:postalCode {
                                        attribute eid_ {
                                            data( (:<<<XPATH:) $postalCode_19_in0-index
(:>>>:) )
                                        },
                                        for $text___ in $postalCode_19_in0/text( )
                                        return
                                            data( $text___ )
                                },
                                for $country_24_in0 at $country_24_in0-index in
$addr_2_in0/io:country
                                return
                                    element io:country {
                                        attribute eid_ {
                                            data( (:<<<XPATH:) $country_24_in0-index (:>>>:) )
                                        },
                                        for $text___ in $country_24_in0/text( )
                                        return
                                            data( $text___ )
                                    }
                        },
                        for $name_32_in0 at $name_32_in0-index in
$recordTarget_0_in0/io:patientRole/io:patient/io:name
                        return
                            element io:name {
                                attribute eid_ {
                                    data( (:<<<XPATH:) $name_32_in0-index (:>>>:) )
                                },
                                for $text___ in $name_32_in0/text( )
                                return
                                    data( $text___ ),
                                for $family_34_in0 at $family_34_in0-index in
$name_32_in0/io:family
                                return
                                    element io:family {
                                        attribute eid_ {
                                            data( (:<<<XPATH:) $family_34_in0-index (:>>>:) )
                                        },
                                        for $text___ in $family_34_in0/text( )
                                        return
                                            data( $text___ )
                                },
                                for $given_39_in0 at $given_39_in0-index in
$name_32_in0/io:given
                                return
                                    element io:given {
                                        attribute eid_ {
                                            data( (:<<<XPATH:) $given_39_in0-index (:>>>:) )
                                        },
                                        for $text___ in $given_39_in0/text( )
                                        return
                                            data( $text___ )
```

-continued

```
                    }
                },
            let $administrativecode_47_in0 :=
$recordTarget_0_in0/io:patientRole/io:patient/io:administrativeCode
                return
                    element io:administrativeCode {
                        if ( $administrativeCode_47_in0/@displayName )
                        then
                            attribute displayName { data(
$administrativeCode_47_in0/@displayName ) }
                        else
                            ( ),
                        if ( $administrativeCode_47_in0/@codeSystem )
                        then
                            attribute codeSystem { data(
$administrativeCode_47_in0/@codeSystem ) }
                        else
                            ( ),
                        if ( $administrativeCode_47_in0/@code )
                        then
                            attribute code { data( $administrativeCode_47_in0/@code ) }
                        else
                            ( ),
                        if ( $administrativeCode_47_in0/@codeSystemName )
                        then
                            attribute codeSystemName { data(
$administrativeCode_47_in0/@codeSystemName ) }
                        else
                            ( ),
                        attribute eid_ {
                            data( (:<<<XPATH:) 1 (:>>>:) )
                        }
                    },
            let $birthTime_58_in0 :=
$recordTarget_0_in0/io:patientRole/io:patient/io:birthTime
                return
                    element io:birthTime {
                        if ( $birthTime_58_in0/@value )
                        then
                            attribute value { data( $birthTime_58_in0/@value ) }
                        else
                            ( ),
                        attribute eid_ {
                            data( (:<<<XPATH:) 1 (:>>>:) )
                        }
                    }
                }
            }
        }
    }
' PASSING S.XMLDOC AS "sd"
COLUMNS DOC XML PATH '.') XQ
)
```

'Statement (4):

```
SELECT X.FILENAME
DOCID,T_0.ID,T_0.ANCESTOR_ID,T_0.ADDRESS_STREET,T_0.ADDRESS
_CITY,T_0.ADDRESS_STATE,T_0.ADDRESS_POSTALCODE,T_0.ADDRES
S_COUNTRY,T_0.FAMILY_NAME,T_0.GIVEN_NAME,T_0.CODESYSTEM,
T_0.CODE,T_0.CODESYSTEMNAME,HIWAS.SOURCE_TIMESTAMP(T_0.
BIRTHTIME) BIRTHTIME
FROM T X,
```

'Statement (5):

```
XMLTABLE(
XMLNAMESPACES('urn:hl7-org:v3' AS "tns"),
'$d/tns:Report/tns:patient' PASSING X.DOC AS "d"
COLUMNS ID VARCHAR(128) PATH 'fn:concat(1,".",@eid_)',
    ANCESTOR_ID VARCHAR(128) PATH '1',
    ADDRESS_STREET VARCHAR(128) PATH
        './tns:PermanentHomeAddress/tns:streetAddressLine',
    ADDRESS_CITY VARCHAR(64) PATH
        './tns:PermanentHomeAddress/tns:city',
    ADDRESS_STATE VARCHAR(5) PATH
        './tns:PermanentHomeAddress/tns:state',
    ADDRESS_POSTALCODE VARCHAR(16) PATH
        './tns:PermanentHomeAddress/tns:postalCode',
    ADDRESS_COUNTRY VARCHAR(64) PATH
```

-continued

```
'./tns:PermanentHomeAddress/tns:country',
    FAMILY_NAME VARCHAR(256) PATH './tns:name/tns:family',
    GIVEN_NAME VARCHAR(256) PATH './tns:name/tns:given',
'./tns:administrativeCode/@codeSystem',
    CODE VARCHAR(256) PATH './tns:administrativeCode/@code',
    CODESYSTEMNAME VARCHAR(256) PATH
'./tns:administrativeCode/@codeSystemName',
    BIRTHTIME VARCHAR(32) PATH './tns:birthTime/@value')
T_0.
```

The Statement (3) fragments comprise the generated XQuery expression that maps the original XML document to a simplified document based on the target XML model. The Statement (2) fragment is the XMLTable function invocation that joins with the table (in this case, XMLDOCTABLE) that contains the original XML document, and wraps around the XQuery expression to output the transformed document as an XML column inside a common table expression (i.e., an inline virtual table). This virtual table of documents may be referenced multiple times to extract the XML data needed to populate individual columns of the view. The Statement (5) fragment is another XMLTable function invocation that populates columns in the view by extracting data from elements/attributes of the transformed documents contained in the virtual table. In this non-limiting example, for each column of the view being defined, a path may be provided to designate the location within the transformed document of the XML data it should contain and the SQL data type to which that data should be converted.

Referring to FIG. 8, therein is depicted an example target XML model according to an embodiment. The following example provides a SQL/XML create view statement for the target XML model of FIG. 8 generated according to an embodiment:

'Statement (1):

```
CREATE VIEW EGIP_WAREHOUSE.VITAL_SIGNS (
    DOCID,
    ID,
    ANCESTOR_ID,
    TEST_NAME,
    TEST_CODE,
    OBSERVATION_TIME,
    TEST_VALUE,
    TEST_UNIT
) AS
```

'Statement (2):

```
WITH T AS (
SELECT S.NAME, XQ.DOC FROM XMLDOCTABLE S, XMLTABLE(
XMLNAMESPACES('urn:hl7-org:v3' AS "tns"), '(: Prolog :)
(: Static namespace declarations :)
declare namespace xsl="http://www.w3.org/1999/XSL/Transform";
declare namespace xalan="http://xml.apache.org/xslt";
declare namespace str="http://exslt.org/strings";
declare namespace set="http://exslt.org/sets";
declare namespace math="http://exslt.org/math";
declare namespace fn="http://www.w3.org/2005/xpath-functions";
declare namespace exsl="http://exslt.org/common";
declare namespace date="http://exslt.org/dates-and-times";
declare namespace io="urn:hl7-org:v3";
declare namespace xsi="http://www.w3.org/2001/XMLSchema-instance";
declare namespace xs="http://www.w3.org/2001/XMLSchema";
declare namespace msl="http://www.ibm.com/xmlmap";
declare namespace jdbc="jdbc://com.ibm.ct.db";
(: Declare external Java method calls :)
        document {
            element io:Report {
                let $entry_0_in0 :=
$sd/io:ClinicalDocument/io:component/io:structuredBody/io:component/io:sectio
n/io:entry
                return
                    for $entry_0_in0 at $entry_0_in0-index in (:<<<FOR:)
$entry_0_in0[(../io:templateId/@root = "2.16.840.1.113883.10.20.1.16") and
(../io:code/@codeSystem = "2.16.840.1.113883.6.1") and (../io:code/@code =
"8716-3") and (../../../../../io:code/@codeSystem = "2.16.840.1.113883.6.1") and
(../../../../../io:code/@code = "34133-9") and (../../../../../io:templateId/@root =
"2.16.840.1.113883.3.88.11.32.1") and (io:organizer/io:templateId/@root =
"2.16.840.1.113883.10.20.1.35") and (io:organizer/@classCode = "CLUSTER")
and (io:organizer/io:code/@codeSystem = "2.16.840.1.113883.6.96") and
(io:organizer/io:code/@code = "46680005") and (io:organizer)] (:>>>:)
                    return
                        element io:Vitalsigns {
                            attribute eid_ {
                                data( (:<<<XPATH:) $entry_0_in0-index (:>>>:) )
                            },
                            for $component_2_in0 at $component_2_in0-index in
$entry_0_in0/io:organizer/io:component
                            return
                                element io:component {
                                    attribute eid_ {
                                        data( (:<<<XPATH:) $component_2_in0-index (:>>>:) )
                                    },
                                    let $observation_4_in0 := $component_2_in0/io:observation
```

```
                                    where (:<<<LOC:) $observation__4__in0[(io:code/@codeSystem
= "2.16.840.1.113883.6.1") and (io:code/@code = "3141-9") and
(io:templateId/@root = "2.16.840.1.113883.10.20.1.31") and (@classCode =
"OBS")] (:>>>:)
                                    return
                                        element io:BodyWeight {
                                            attribute eid__ {
                                                data( (:<<<XPATH:) 1 (:>>>:) )
                                            },
                                            let $code__6__in0 := $observation__4__in0/io:code
                                            return
                                                element io:code {
                                                    if ( $code__6__in0/@displayName )
                                                    then
                                                        attribute displayName { data(
$code__6__in0/@displayName ) }
                                                    else
                                                        ( ),
                                                    if ( $code__6__in0/@code )
                                                    then
                                                        attribute code { data( $code__6__in0/@code ) }
                                                    else
                                                        ( ),
                                                    attribute eid__ {
                                                        data( (:<<<XPATH:) 1 (:>>>:) )
                                                    }
                                                },
                                            let $effectiveTime__13__in0 :=
$observation__4__in0/io:effectiveTime
                                            return
                                                element io:effectiveTime {
                                                    if ( $effectiveTime__13__in0/@value )
                                                    then
                                                        attribute value { data(
$effectiveTime__13__in0/@value ) }
                                                    else
                                                        ( ),
                                                    attribute eid__ {
                                                        data( (:<<<XPATH:) 1 (:>>>:) )
                                                    }
                                                },
                                            let $value__19__in0 := $observation__4__in0/io:value
                                            return
                                                for $value__19__in0 at $value__19__in0-index in (:<<<FOR:)
$value__19__in0[(@xsi:type = "PQ")] (:>>>:)
                                                return
                                                    element io:value {
                                                        if ( $value__19__in0/@value )
                                                        then
                                                            attribute value { data( $value__19__in0/@value ) }
                                                        else
                                                            ( ),
                                                        if ( $value__19__in0/@unit )
                                                        then
                                                            attribute unit { data( $value__19__in0/@unit ) }
                                                        else
                                                            ( ),
                                                        attribute eid__ {
                                                            data( (:<<<XPATH:) $value__19__in0-index (:>>>:)
)
                                                        }
                                                    }
                                        },
                                    let $observation__27__in0 := $component__2__in0/io:observation
                                    where (:<<<LOC:) $observation__27__in0[(io:code/@codeSystem
= "2.16.840.1.113883.6.1") and (io:code/@code = "8302-2") and
(io:templateId/@root = "2.16.840.1.113883.10.20.1.31") and (@classCode =
"OBS")] (:>>>:)
                                    return
                                        element io:BodyHeight {
                                            attribute eid__ {
                                                data( (:<<<XPATH:) 1 (:>>>:) )
                                            },
                                            let $code__29__in0 := $observation__27__in0/io:code
                                            return
```

-continued

```
                                    element io:code {
                                       if ( $code__29__in0/@displayName )
                                       then
                                          attribute displayName { data(
$code__29__in0/@displayName ) }
                                       else
                                          ( ),
                                       if ( $code__29__in0/@code )
                                       then
                                          attribute code { data( $code__29__in0/@code ) }
                                       else
                                          ( ),
                                       attribute eid__ {
                                          data( (:<<<XPATH:) 1 (:>>>:) )
                                       }
                                    },
                                 let $effectiveTime__36__in0 :=
$observation__27__in0/io:effectiveTime
                                 return
                                    element io:effectiveTime {
                                       if ( $effectiveTime__36__in0/@value )
                                       then
                                          attribute value { data(
$effectiveTime__36__in0/@value ) }
                                       else
                                          ( ),
                                       attribute eid__ {
                                          data( (:<<<XPATH:) 1 (:>>>:) )
                                       }
                                    },
                                 let $value__41__in0 := $observation__27__in0/io:value
                                 return
                                    for $value__41__in0 at $value__41__in0-index in (:<<<FOR:)
$value__41__in0[(@xsi:type = "PQ")] (:>>>:)
                                    return
                                       element io:value {
                                          if ( $value__41__in0/@value )
                                          then
                                             attribute value { data( $value__41__in0/@value ) }
                                          else
                                             ( ),
                                          if ( $value__41__in0/@unit )
                                          then
                                             attribute unit { data( $value__41__in0/@unit ) }
                                          else
                                             ( ),
                                          attribute eid__ {
                                             data( (:<<<XPATH:) $value__41__in0-index (:>>>:)
)
                                          }
                                       }
                                 }
                              }
                           }
                        }
                     }
' PASSING S.XMLDOC AS "sd"
COLUMNS DOC XML PATH '.') XQ
)
```

'Statement (3):

```
SELECT X.NAME
DOCID,T__0.ID,T__0.ANCESTOR__ID,T__0.TEST__NAME,T__0.TEST__CODE,HI
WAS.SOURCE__TIMESTAMP(T__0.OBSERVATION__TIME)
OBSERVATION__TIME,T__0.TEST__VALUE,T__0.TEST__UNIT
FROM T X,
XMLTABLE(
XMLNAMESPACES('urn:hl7-org:v3' AS "tns"),
'$d/tns:Report/tns:Vitalsigns/tns:component/tns:BodyWeight' PASSING X.DOC
AS "d"
```

-continued

```
COLUMNS ID VARCHAR(128) PATH
'fn:concat(1,".",../../@eid_,".",../../@eid_,".",@eid_);
    ANCESTOR_ID VARCHAR(128) PATH '1',
    TEST_NAME VARCHAR(256) PATH './tns:code/@displayName',
    TEST_CODE VARCHAR(256) PATH './tns:code/@code',
    OBSERVATION_TIME VARCHAR(32) PATH
'./tns:effectiveTime/@value',
    TEST_VALUE DECIMAL(6,2) PATH './tns:value/@value',
    TEST_UNIT VARCHAR(256) PATH './tns:value/@unit')
T_0
UNION ALL
SELECT X.NAME
DOCID,T_1.ID,T_1.ANCESTOR_ID,T_1.TEST_NAME,T_1.TEST_CODE,HI
WAS.SOURCE_TIMESTAMP(T_1.OBSERVATION_TIME)
OBSERVATION_TIME,T_1.TEST_VALUE,T_1.TEST_UNIT
FROM T X,
XMLTABLE(
XMLNAMESPACES('urn:hl7-org:v3' AS "tns"),
'$d/tns:Report/tns:Vitalsigns/tns:component/tns:BodyHeight' PASSING X.DOC
AS "d"
COLUMNS ID VARCHAR(128) PATH
'fn:concat(1,".",../../@eid_,".",../../@eid_,".",@eid_)',
    ANCESTOR_ID VARCHAR(128) PATH '1',
    TEST_NAME VARCHAR(256) PATH './tns:code/@displayName',
    TEST_CODE VARCHAR(256) PATH './tns:code/@code',
    OBSERVATION_TIME VARCHAR(32) PATH
'./tns:effectiveTime/@value',
    TEST_VALUE DECIMAL(6,2) PATH './tns:value/@value',
    TEST_UNIT VARCHAR(256) PATH './tns:value/@unit')
T_1
```

The Statement (2) fragment is an XMLTable function invocation wrapped around an XQuery expression, as in the previous example. As before, its output is an XML column within a common table expression that contains documents transformed to conform to the simplified target model. The Statement (3) fragment contains a pair of XMLTable function invocations each of which extracts data from elements/attributes of the transformed documents and converts them to columns in virtual tables. The virtual tables are then combined into the single output table specified by the relational model using the UNION ALL operator. The virtual table "T" defined by the wrapped XQuery expression is referenced in each of the SELECT statements (e.g., "FROM T X," "X.DOC").

SQL/XML views, such as those provided herein, may be generated through view-creation statements. The following provides an exemplary process configured according to an embodiment for generating the SQL/XML view-creation statement for the SQL/XML view for the target XML model of FIG. 8 provided immediately above:

(1) Find all the SQL tables, SQLTables, being mapped to elements in the target model as well as the associated SQL columns (2) For each table, table$_N$, in SQLTables
   A. Generate the XQuery statement corresponding to the elements referenced by table$_N$ and its columns in the following ways:
      i. Construct a smaller target model, which contains only the element/attribute nodes, which are referenced by table$_N$ and its column, including all the immediate ancestor nodes
      ii. Create a mapping (using MSL specification) to map the original document to this target model
      iii. Generate the XQuery based on the mapping using the MSL mapper, and binding the entry root path as variable, sd.
      iv. Add the XMLTable statement around and join it with the table, SourceTable, which contains the original XML document (in column XMLDOC), and then put it inside a common table expression, like the following:
      Assume the namespace of the target model is specified in <namespace uri>.

```
WITH T AS (
SELECT S.NAME, XQ.DOC FROM <SourceTable> S,
XMLTABLE(
XMLNAMESPACES('<namespace uri>' AS "tns"),
'<XQuery statement>' PASSING S.<XMLDOC> AS "sd"
COLUMNS DOC XML PATH '.') XQ
)
```

Call this virtual table, VT$_N$.

(3) For each element, elementNode$_N$, mapped to the table, table$_N$
   A. Generate a SELECT statement which joins with the VT$_N$ and extract data to be mapped to the corresponding columns in the table
      i. Calculate the relative path Path$_E$ from the element node, elementNode$_N$, to the root element of the target model, R
      ii. Compose the column-generating expression for each mapped column under elementNode$_N$ for table$_N$
         a. For each mapped column, column$_{I\_N}$,
            1. Let columnNode$_{I\_N}$ be the element/attribute node mapped to column$_{I\_N}$. If there is no element mapped to column$_{I\_N}$ under subtree of elementNode$_{I\_N}$, columnNode$_{I\_N}$ set to null.
            2. Check whether columnNode$_{I\_N}$ is null
            If columnNode$_{I\_N}$ is not null, calculate the relative path, columnPath$_{I\_N}$, from columnNode$_{I\_N}$ to elementNode$_{I\_N}$
            Otherwise, set columnPath$_{I\_N}$ to an empty xpath sequence, "( )".

3. Create the following column-generating expression, $columnExpr_{I\_N}$: '<$column_{I\_N}$ name><$column_{I\_N}$ SQL type>PATH '<columnPath$_{I\_N}$>'

4. Append the $columnExpr_{I\_N}$ to the column list, $columnExprSet_{I\_N}$

B. Compose the SELECT statement, $SelectStmt_{E\_N}$, in the following way:

```
SELECT X.NAME DOCID, <list of column_I_N in table_N>
FROM VT_N X,
XMLTABLE(
    XMLNAMESPACES('<namespace uri of the target model>' AS
    "tns"),
    '<Path_E>' PASSING X.DOC AS "d"
    COLUMNS
        <columnExprSet_N>
) T_I_N
```

C. Append $SelectStmt_{E\_N}$ to the SelectStmtSet, and unionized by UNION ALL operator D. Compose the final CREATE VIEW statement, like the following:

```
CREATE VIEW <name of table_N> (<columnI_N projection mapped to
tableN>)
) AS VT_N
<SelectStmtSet>
```

E. Add the create view statement to a SQL file

The description now turns to example embodiments illustrated through a Medical Information System (MIS) test case system which, inter alia, provides a tool that creates a structural summary of a collection of XML documents wherein users may find relevant information for a specific purpose within complex XML documents. A non-limiting example provides that a MIS test case system user may create a target model that contains just the information they need, in a simplified representation that can be queried efficiently and is compatible with existing relational BI technology.

Around the world, governments are taking steps to encourage the electronic interchange of healthcare information. A key part of this effort is the development of standards for the representation of clinical data, so that information produced by one organization can be consumed and acted upon by other entities. A leading contender among the proposed standards for healthcare data is the XML-based Clinical Document Architecture (CDA), developed by the international healthcare standards organization Health Level Seven (HL7). The standard was designed to facilitate several goals, among them the ability to represent virtually any kind of clinical data. While this flexibility is one of the key benefits of CDA, it also poses significant challenges for the design of software intended to aggregate and analyze large collections of clinical data obtained from a variety of sources. The MIS test case system provides processes for finding relevant information in such documents and extracting it in a representation that can be analyzed using current relational BI technology (e.g., Cognos®, BIRT, SAS®, and SPSS®).

The MIS test case system may be configured according to embodiments to provide the following functionality: inspect a collection of XML documents for analysis and build a SDG configured to focus attention on those structural variants that actually exist in the collection, typically a much smaller set than those theoretically allowed by the schema; identify document elements in the SDG with semantically-meaningful names derived from supplemental information, rather than generic element names derived solely from the XML schema; and allow for selection of elements of interest from the SDG into a target model that is constructed incrementally, rather than requiring a target schema to be constructed prior to mapping.

Figure 9:
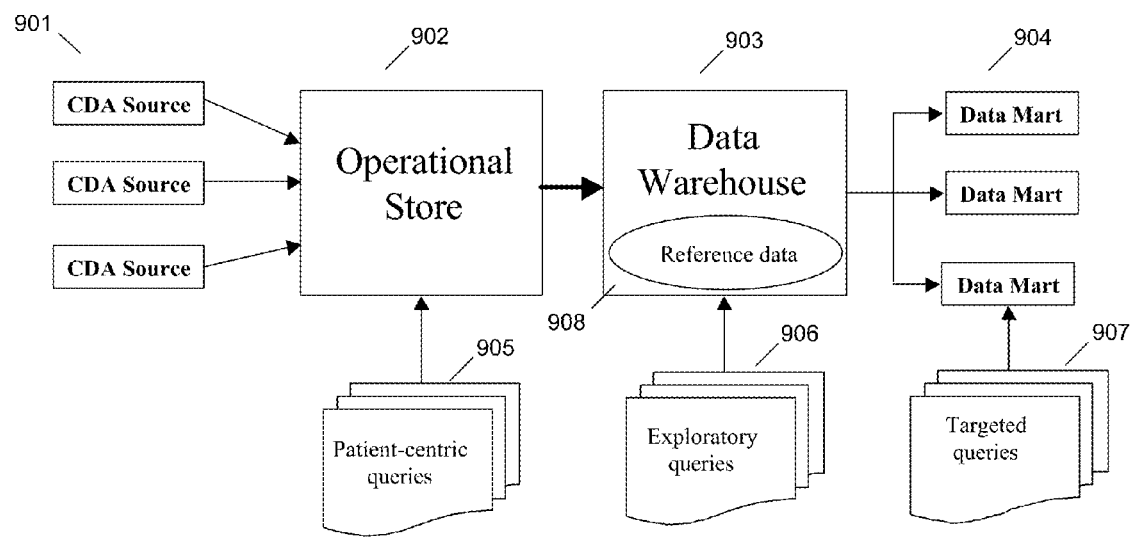
FIG. 9 provides an example data warehouse environment according to an embodiment.

Referring to FIG. 9, therein is provided an example data warehouse environment according to an embodiment within the MIS test case system. CDA documents 901 created by various sources (e.g., electronic medical record systems or laboratory information systems) are collected in an operational store 902 whose primary purpose is day-to-day patient care. Patient-centric queries 905 against the operational 902 store typically seek to retrieve one or more documents about a particular patient. An exemplary patient-centric query may seek to locate specific documents for a particular patient. To facilitate queries over aggregated data from many patients, information is extracted from the operational store 902 to a data warehouse 903 with a more-specific purpose. Exploratory queries 906 may be run on data stored in the data warehouse 903, which may also include reference data 908. Data may be further accessed by users through one or more data marts 904, which may be configured to handle targeted queries 907.

Much of the information in an operational store 902 may not be relevant for the purpose envisioned for the data warehouse 903. For example, if the data warehouse 903 is intended for clinical investigations, custodial information about documents or test specimens is probably unnecessary. However, this information might be very important for a warehouse intended to monitor regulatory compliance. Unlike queries posed against the operational store, exploratory queries 906 against a clinical data warehouse 903 may focus on aggregated data from many patients.

Before undertaking an in-depth study, a researcher must establish how many patients meet basic criteria and which patients' data should be included in the study. The MIS test case system is configured according to embodiments to allow for such queries directly on the warehouse using conventional BI tools. For the actual study, further cleansing and transformation of the data may be needed, and data for the selected patient cohort is often exported to a data mart using Extract/Transform/Load (ETL) tools. Existing BI tools may be utilized according to embodiments for such data warehousing and querying operations.

When building the warehouse, data conforming to healthcare XML standards must be integrated with reference data and made compatible with existing tools. To build a warehouse of clinical information concerning, for example, cancer patients, an investigator using today's tools would be faced with a difficult and largely manual task. Starting from a complex specification and thousands of de-identified documents, the investigator would first have to undertake a period of manual inspection, to better understand the data available and to determine which pieces are relevant for this particular warehouse. The investigator would then need to decide how best to store this information, so that queries and relational-based business intelligence software could digest it efficiently and integrate it with reference information like value sets and disease taxonomies.

Typically, this would involve designing both a relational target schema and an executable mapping to populate the target schema from CDA documents. Existing schema-mapping tools that rely heavily on the XML schema of the source documents as a means of describing the data to be transformed would be of little value, since, for example, the schema does not delineate a primary diagnosis of cancer from a family history of cancer, nor differentiate the document section containing current medications from the section containing laboratory test results. Schema mapping tools also assume that the target schema has been designed beforehand, and then require the expert to explicitly connect source and target elements that correspond to one another, typically by drawing lines in a graphical user interface. With documents as complex as CDA instances, the number of explicit connections needed to express a comprehensive mapping rapidly becomes unmanageable. Furthermore, since the source of each correspondence is a generic schema element that might contain many different types of information, elaborate conditions must be added to each mapping to select only the items desired.

Figure 10:
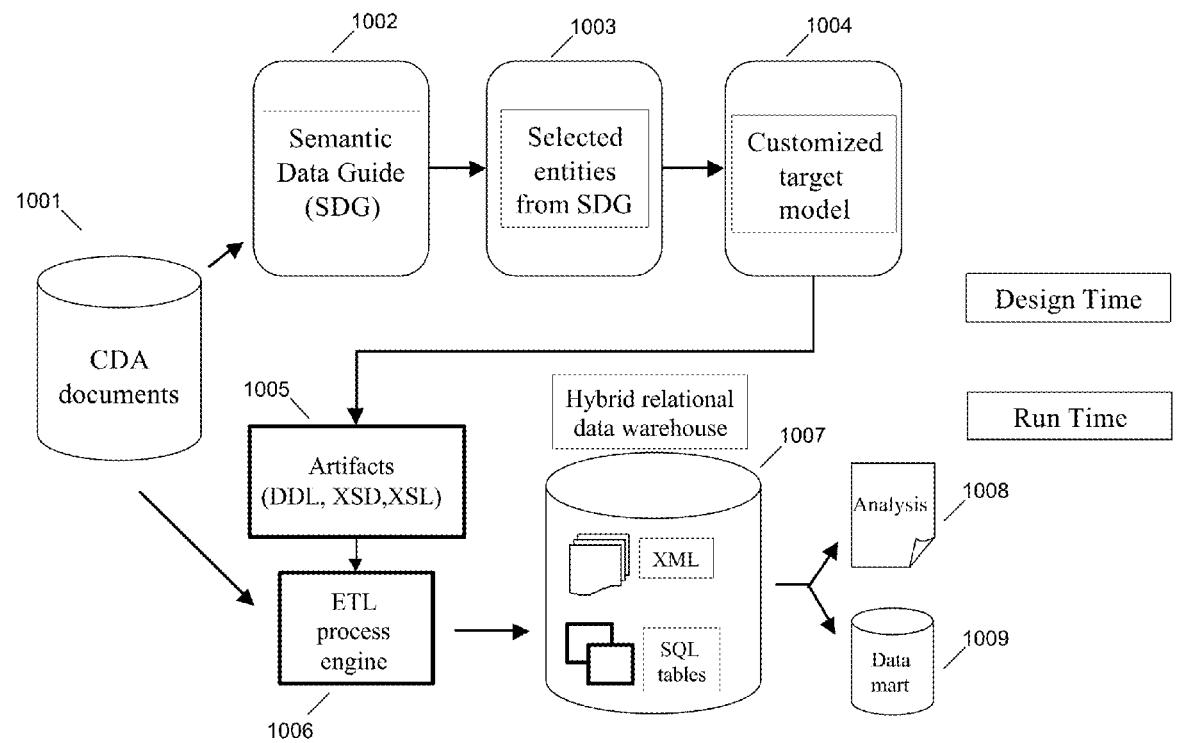
FIG. 10 provides an example process for building a data warehouse according to an embodiment.

An example process for building a MIS test case system data warehouse according to an embodiment is provided in FIG. 10. An SDG 1002 is generated based on source CDA documents 1001. According to embodiments, the SDG 1002 may be configured to provide a structural summary of a collection of XML (e.g., CDA documents 1001) documents that takes advantage of codes, template identifiers and other information in the documents to replace generic element names based on the XML schema with meaningful ones. The SDG 1002 also provides statistical information about the frequency with which specific constructs occur in a particular context, co-occurrence of concepts in documents, and the like.

After using the SDG 1002 to identify data of interest, the MIS test case system operates to construct a simpler representation of that information in the form of a target model 1004. Like the source XML documents 1001, the target model 1004 is hierarchical. Using a selection paradigm (e.g., drag-and-drop), a user may select information of interest 1003 from the SDG 1002 and add it to the target model 1004. The target model 1004 may be instantiated and populated with data from transformed documents.

Artifacts 1005 may be generated from the target model 1004. According to embodiments, one artifact 1005 may consist of an XML map file that contains a high-level specification of the mapping from source XML documents to XML documents that conform to the target model, represented in Mapping Specification Language (MSL). The MSL specification may then be used to generate another artifact 1005, an XSLT script or XQuery that can perform the actual transformation. According to the MIS test case system, the code that produces the transform mapping may be derived from other applications, such as International Business Machines Corporations' WebSphere® Integration Developer (WID). WebSphere® is a registered trademark of International Business Machines Corporation in the United States, other countries, or both. Another artifact 1005 that may be generated in the MIS test case system is XML schema (XSD) that corresponds to the target model. In addition, the MIS test case system may be configured to automatically augment this XML schema with directives for annotated databases, such as the DB2® Annotated Schema Decomposition Engine. SQL DDL are another artifact 1005 that may be generated according to embodiments. DDL consist of statements for creating relational tables.

The MIS test case system was implemented as a set of Eclipse plugins created by the Eclipse Foundation, which can easily be integrated with other ETL, modeling and business intelligence tools, especially those that are also based on Eclipse. Once a target model 1004 has been designed using the MIS test case system, the artifacts 1005 that are produced may be used by ETL tools 1006 to generate data for a data warehouse 1007. Data may be analyzed 1008, for example, through BI tools, or accessed by users, such as through a data mart 1009.

As discussed previously, discriminators may be used to better describe the XML documents in a collection. According to embodiments, a configuration mechanism may be provided for defining an extensible set of context-sensitive discriminators. The following provides an example of discriminator definitions according to an embodiment in context of the MIS test case system:

```
<discriminator id="1"> ----------------- Rule (1)
    <name>participant</name>
    <attribute type="identifier">
        typeCode
    </attribute>
</discriminator>
<discriminator id="2"> ----------------- Rule (2)
<descendant>
    <name>code</name>
    <attribute type="identifier">
        Code
    </attribute>
    <attribute type="identifier">
        codeSystem
    </attribute>
</descendant>
</discriminator>
<discriminator id="3">------------------ Rule (3)
    <name>ClinicalDocument</name>
    <descendant>
        <name>templateId</name>
        <attribute type="identifier">
            Root
        </attribute>
    </descendant>
</discriminator>
```

Rule (1) states that in any XML element named participant, the attribute named typeCode should be used as a discriminator. As such, participant elements with different typeCode values will be treated as separate elements in the SDG. Rule (2) differs from Rule (1) in that it applies not to an element with a specific name, but rather to any XML element which has an immediate descendant element named code that contains both code and codeSystem attributes. Any element containing a code will be split into variants based on the joint values of code and codeSystem.

Rule (3) demonstrates how both these approaches can be combined. In this case, the value of the root attribute of a templateId element is used as a discriminator, but only if the templateId element is the immediate descendant of a ClinicalDocument element. In addition, values from multiple immediate descendant elements to define a discriminator. In this case, the element will not be discriminated unless it has all the specified immediate descendant elements. In addition, discriminators may be disabled in specific contexts. Discriminator values are used not only to differentiate elements, but also to label nodes in the SDG. As such, a discriminator value itself can be used in the label, or it can be used as a lookup key for a display name defined elsewhere. For example, if a particular element contains an identifier element with a root attribute value, this value may be looked up in a table, yielding a display name for use in labels.

A target model editor configured according to embodiments may allow a user to incrementally construct a hierarchical target model that can be realized as transformed XML documents or as a set of relational tables. A target model editor configured according to embodiments may use a drag-and-drop paradigm to construct the target model. A data element can be selected from any of the SDG views described above. The selected element is then dragged to the target model and inserted at a specific location, for example, as a new immediate descendant for an existing node.

A data element may be selected from the SDG and incorporated into the target document. This action may operate to indicate that when an instance of the XML subtree represented by the SDG node is found in a source document, it is to be copied and inserted into the target document at the indicated location within an existing subtree, for example, one that was created by copying another subtree from source to target. When there is at most one occurrence of the source subtree in the source document, and the target location can occur at most once in the target document, there is no ambiguity. However, the source subtree can occur multiple times (e.g., if its root element, or an immediate ancestor of its root element, has been observed to occur more than once in a source document), as can the target location (e.g., if it is embedded in a subtree that can occur more than once). In these cases, embodiments provide that a rule may be generated to determine which source subtree instance(s) should be copied to which target subtree instance(s).

In the MIS test case system, the hierarchical nature of the documents was used as a heuristic for matching subtrees. When a new SDG node is inserted below a target model node, the MIS test case system determines the SDG node that corresponds to the target node, which may have been created, explicitly or implicitly, by a previous insertion. The MIS test case system then attempts to determine the minimal common subtree of the SDG that includes both the new and existing target elements. When transforming a source document, the MIS test case system may be configured to copy into each existing target subtree all instances of the new subtree that share the same common minimal subtree in the source document.

A non-limiting example involves a set of laboratory report documents that each contains one or more act elements, each act associated with a different group of tests (hematology, microbiology, etc.) all performed on a single specimen. Within each act are one or more observations, each of which corresponds to the results of a specific test performed on the specimen. An SDG generated according to embodiments may contain nodes for each kind of act, and beneath each act provide a node for the specimen, and one for each test result.

In another non-restrictive example, a user may drag an SDG node representing a test observation from the Microbiology Studies act into the target model, as an immediate descendant of the root node. The MIS test case system may interpret this as a request to include all subtrees that represent the test results in the target document. If the "specimen" node from the Microbiology act is moved to the target model and inserted as an immediate descendant of the previously inserted test observation node, the MIS test case system may interpret this as a request to copy specimen information from the minimal common subtree shared by the specimen node and the test node into the test result in the target model. The minimal common subtree shared by both nodes has as its root the "act" node that contains both the specimen and test result information, so information about the specimen for the act will be copied to the result structure for the test in which the specimen was used.

As a further non-limiting example, document elements associated with a Microbiology Studies act also included a list of technicians involved in the test. If the technicians node was also inserted into the test observation subtree described above, the information affiliated with the technicians associated with the act would be added to the test result subtree.

Because the SDG is a summary of many documents, the minimal common subtree containing two nodes in the SDG is not necessarily the minimal common subtree for those two nodes in any specific document in which they appear. For example, the root node of the common subtree in the SDG may occur multiple times in source documents, but both nodes of interest may never occur as immediate descendants of any single instance of the apparent common root. In this case, the actual root of the minimal common subtree occurs farther up the hierarchy, at some immediate ancestor of the apparent root. An SDG configured according to embodiments may be utilized to keep track of enough extra information to detect such information, for example, in certain special cases that occur commonly.

In addition to insertion of data elements, a MIS test case system target model editor configured according to embodiments may support several additional operations for customizing the target model. Target model nodes configured according to embodiments may be given a default named using the discriminated element name of their source. Initially empty nodes in the target model may also be created, below which subtrees from unrelated parts of the source document can be grouped. For example, the root of the target model is such an initially empty node. Unwanted subtrees may be deleted from the target model, which allows a complex structure to be inserted into the target and subsequently pruned. Once the target model has been created, embodiments provide that an XLST script or XQuery may be generated by the MIS test case system tool to transform the original CDA documents to the XML document conforming to this model.

After a target XML model has been generated according to embodiments, data elements of the target model may be mapped to a set of relational tables. The default relational mapping generated by the MIS test case system embodiment is a set of tables that mirrors the hierarchy in the target model. In general, each element in the target model that can repeat gives rise to a table in the relational model, and non-repeating elements supply the column values. Information about actual element cardinalities from the SDG is used to eliminate unnecessary tables. An illustrative and non-restrictive example of unnecessary tables are those that correspond to elements in the target model that can occur multiple times in theory (according to the schema) but actually occur only once in practice. According to embodiments, keys may be generated automatically to link tuples in an immediate descendant table to the correct immediate ancestor.

Default relational mapping may be modified in various ways. According to embodiments, tables and columns, whose default names are derived to ensure uniqueness more than readability, may be renamed as appropriate. The MIS test case system is configured to guess the correct data type for each column based on the type of the corresponding XML element. However, because the HL7 data types used in CDA make very limited use of XML types, the default type will usually be a character string. An alternative type may be selected, for example in an editor configured according to the MIS test case system embodiment, and, if necessary, the name of an SQL function may be supplied for conversion. For example, certain document collections may have a "timestamp" data type that may be limited to a string data type with a particular format that does not conform to the standard string representations of an SQL timestamp. As such, embodiments provide for user-defined functions to handle such type conversions.

Portions of the CDA may also be stored as XML, taking advantage of support for hybrid relational-XML databases. Designating the type of a model element as "XML" in the MIS test case system editor causes the subtree rooted at the element to be stored as an XML column in the appropriate table. In the same model, particular elements within the subtree (e.g., ones that need to be joined with other data) can be surfaced as regular relational columns. As such, the full XML context of a piece of information may be preserved for reference, while key elements in relational form are made accessible, for example, to facilitate querying.

As provided herein, embodiments provide processes, methods, apparatuses, devices, systems, and computer program products for transforming hierarchical language, for example, XML, data into relational form. According to embodiments a semantic summary of hierarchical language documents may be generated in the form of a Semantic Data Guide (SDG) data structure. A target hierarchical language model may be generated according to embodiments based on entities of interest in the SDG. Embodiments may be configured to generate artifacts for facilitating the mapping of the target hierarchical language model to a relational data model. The artifacts may be created based on whether a user intends the source hierarchical language data to be materialized as relational tables or visualized as relational views. Although XML has been used herein to describe examples, embodiments are not so limited, as embodiments may be configured to operate with any hierarchical language capable of achieving similar results, including JSON and YAML.

Figure 11:
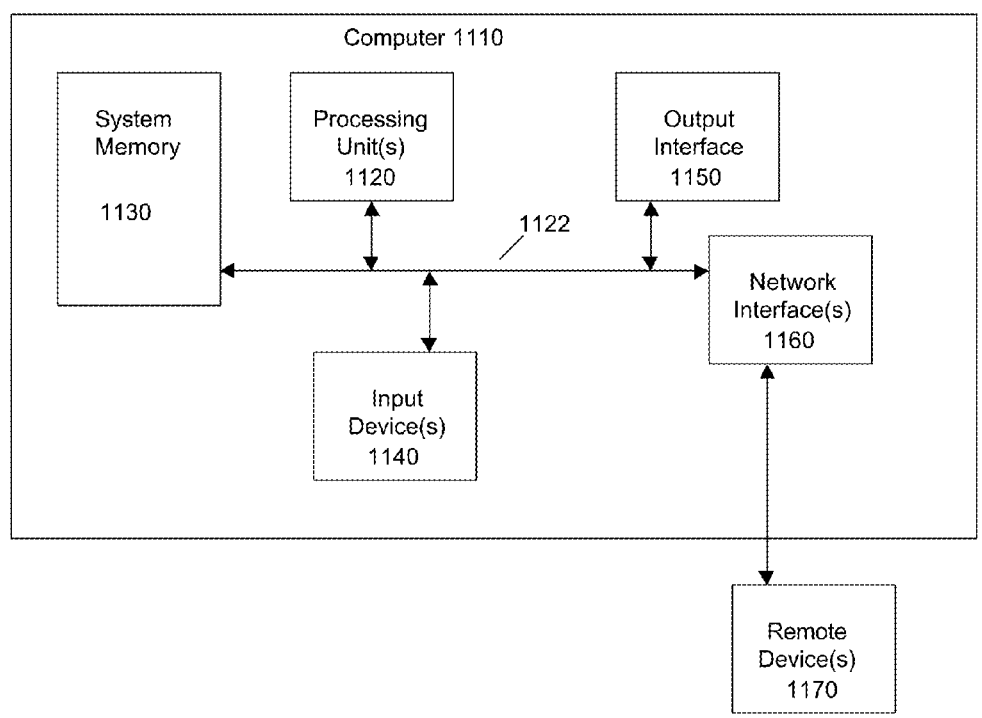
FIG. 11 illustrates an example computer system.

Referring to FIG. 11, it will be readily understood that embodiments may be implemented using any of a wide variety of devices or combinations of devices. An example device that may be used in implementing one or more embodiments includes a computing device in the form of a computer 1110. In this regard, the computer 1110 may execute program instructions; generate at least one information filter comprised of at least one information element; and process at least one source image using the at least one information filter, wherein processing the at least one source image comprises abstracting instances of the at least one information element detected in the at least one source image; and other functionality of the embodiments, as described herein.

Components of computer 1110 may include, but are not limited to, processing units 1120, a system memory 1130, and a system bus 1122 that couples various system components including the system memory 1130 to the processing unit 1120. Computer 1110 may include or have access to a variety of computer readable media. The system memory 1130 may include computer readable storage media in the form of volatile and/or nonvolatile memory such as read only memory (ROM) and/or random access memory (RAM). By way of example, and not limitation, system memory 1130 may also include an operating system, application programs, other program modules, and program data.

A user can interface with (for example, enter commands and information) the computer 1110 through input devices 1140. A monitor or other type of device can also be connected to the system bus 1122 via an interface, such as an output interface 1150. In addition to a monitor, computers may also include other peripheral output devices. The computer 1110 may operate in a networked or distributed environment using logical connections to one or more other remote computers or databases. In addition, Remote devices 1170 may communicate with the computer 1110 through certain network interfaces 1160. The logical connections may include a network, such as a local area network (LAN) or a wide area network (WAN), but may also include other networks/buses.

It should be noted as well that certain embodiments may be implemented as a system, method or computer program product. Accordingly, aspects of the invention may take the form of an entirely hardware embodiment, an entirely software embodiment (including firmware, resident software, microcode, et cetera) or an embodiment combining software and hardware aspects that may all generally be referred to herein as a "circuit," "module" or "system." In addition, circuits, modules, and systems may be "adapted" or "configured" to perform a specific set of tasks. Such adaptation or configuration may be purely hardware, through software, or a combination of both. Furthermore, aspects of the invention may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations for aspects of the invention may be written in any combination of one or more programming languages, including an object oriented programming language such as Java™, Smalltalk, C++ or the like, conventional procedural programming languages, such as the "C" programming language or similar programming languages, and declarative programming languages such as Prolog and LISP. The program code may execute entirely on the user's computer (device), partly on the user's computer, as a stand-alone software package, partly on the user's computer and partly on one or more remote computers or entirely on the one or more remote computers or on one or more servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatuses (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A system comprising:
   at least one processor; and
   a memory device operatively connected to the at least one processor;
   wherein, responsive to execution of program instructions accessible to the at least one processor, the at least one processor is configured to:
   assemble at least one statistical summary of at least one hierarchical language data source;
   access at least one entity of interest selected from the at least one statistical summary;
   generate at least one target hierarchical language model based on the at least one entity of interest; and
   transform data from the at least one hierarchical language data source into at least one relational form by executing transformation artifacts generated based on a type of the at least one relational form;
   wherein the hierarchical language comprises Extensible Markup Language (XML);
   wherein the type of the at least one relational form comprises a set of relational table;
   wherein the transformation artifacts comprise at least one structured query language (SQL) Data Definition Language (DDL) statement, an Extensible Stylesheet Language Transformations (XSLT) script, and an annotated XML schema; and
   wherein executing the transformation artifacts comprises:
   executing the SQL DDL statement to generate at least one relational table for the XML data source; and
   registering the annotated XML schema with a relational database configured to store transformed data from the XML data source.

2. The system according to claim 1, wherein the at least one statistical summary comprises a Semantic Data Guide (SDG).

3. The system according to claim 1, wherein executing the transformation artifacts further comprises:
   executing the XSLT script to transform the XML source data into at least one simplified target XML model; and
   decomposing the at least one simplified target XML model for storage in the relational database.

4. The system according to claim 1, wherein the type of the at least one relational form comprises a set of relational views.

5. The system according to claim 4, wherein the transformational artifacts comprise at least one SQL/XML view definition statement.

6. The system according to claim 4, wherein executing the transformation artifacts comprises executing the at least one SQL/XML view definition statement to create views in a relational database configured to store transformed data from the XML data source.

7. A computer program product comprising:
   a computer readable storage medium having computer readable program code configured, the computer readable program code comprising:
   computer readable program code configured to assemble at least one statistical summary of at least one hierarchical language data source;
   computer readable program code configured to access at least one entity of interest selected from the at least one statistical summary;
   computer readable program code configured to generate at least one target hierarchical language model based on the at least one entity of interest; and
   computer readable program code configured to transform data from the at least one hierarchical language data source into at least one relational form by executing transformation artifacts generated based on a type of the at least one relational form;
   wherein the hierarchical language comprises Extensible Markup Language (XML);
   wherein the type of the at least one relational form comprises a set of relational tables;
   wherein the transformation artifacts comprise at least one structured query language (SQL) Data Definition Language (DDL) statement, an Extensible Stylesheet Language Transformations (XSLT) script, and an annotated XML schema; and
   wherein executing the transformation artifacts comprises:
   executing the SQL DDL statement to generate at least one relational table for the XML data source: and
   registering the annotated XML schema with a relational database configured to store transformed data from the XML data source.

* * * * *